STUCK RELAY ALARM CIRCUIT

Filed Aug. 5, 1966 12 Sheets-Sheet 1

Dec. 23, 1969 J. G. PEARCE ET AL 3,485,955

STUCK RELAY ALARM CIRCUIT

Filed Aug. 5, 1966 12 Sheets-Sheet 2

STUCK RELAY ALARM CIRCUIT

United States Patent Office 3,485,955
Patented Dec. 23, 1969

3,485,955
STUCK RELAY ALARM CIRCUIT
James G. Pearce and William W. Pharis, Rochester, N.Y., assignors to Stromberg-Carlson Corporation, Rochester, N.Y., a corporation of Delaware
Filed Aug. 5, 1966, Ser. No. 570,475
Int. Cl. H04m 3/00
U.S. Cl. 179—18 16 Claims

ABSTRACT OF THE DISCLOSURE

In connection with time shared equipment, a circuit for detecting improper operation of a relay or other circuit element in a relay control circuit through periodic scanning of the control circuit to compare the control circuit condition with the expected condition, and means for attempting to eliminate the improper circuit condition upon detection thereof.

The present invention relates in general to telephone systems and more particularly to a stuck relay alarm circuit for an automatic electronic common control telephone system.

The stuck relay alarm circuit of the invention may be utilized, for example, with the Universal Junctor Circuit disclosed in application Ser. No. 552,283 of James Gordon Pearce et al. filed May 23, 1966, and assigned to the assignee of the present application, wherein a junctor circuit is provided which is capable of both originating and terminating functions and is provided with both line sensors and relay controls.

In common control circuits, such as the universal junctor circuit disclosed in the above-mentioned application of James Gordon Pearce et al., which junctor circuit is associated with service equipment on a time-share basis and includes a plurality of control relays of the latching type, it is necessary to insure that the relays and other elements in the junctor circuit are returned to their initial or reset condition prior to connection of the circuit to another transmission line or other common equipment. This is especially true in circuits using latching relays where positive signals must be applied to the relays to reset them before the circuit is in an inactive state and ready for subsequent use. Where through some malfunction a latching relay is not reset at the end of a particular operation, the association of the circuit with the latched relay to other common equipment can lead to subsequent malfunctions and inaccuracies throughout the system.

It is therefore an object of the instant invention to provide a circuit for use in conjunction with relay control circuits for detecting and indicating the improper condition of the relay circuit prior to its association with transmission circuits or other common equipment.

It is another object of the instant invention to provide a circuit for detection of malfunction in a relay control circuit and to initiate means for rectifying the malfunction prior to association of the relay control circuit with other equipment.

It is a further object of the instant invention to provide an alarm circuit for detecting the malfunction in a relay control circuit and for providing indication of this malfunction along with prevention of further use of the relay control circuit until the malfunction has been eliminated.

Basically, the invention provides a circuit for detecting a condition attributable only to the improper operation or condition of a relay or other circuit element in a relay control circuit through detection of circuit conditions on a periodic basis and comparison of these circuit conditions with conditions which should prevail as a result of predetermined design. The invention also provides means for attempting to eliminate the improper circuit condition upon detection thereof and further means for providing an alarm indication should the circuit rectifying means be ineffectual to eliminate the malfunction.

These and other objects, features and advantages of the invention will become more apparent from the following detailed description when taken in conjunction with the accompanying drawings, which disclose one embodiment of the invention, and wherein.

Figure 2:
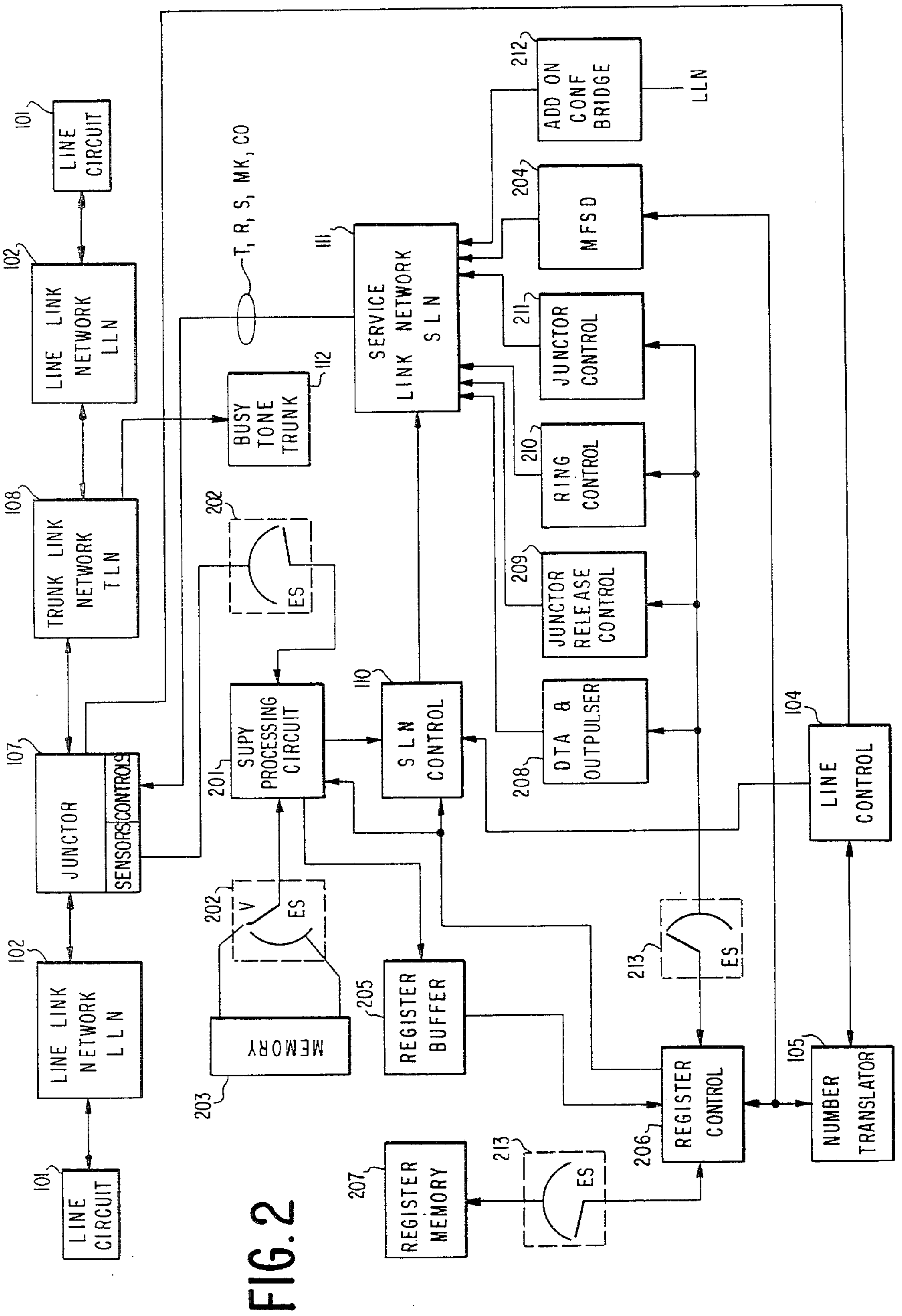
FIGURE 2 is a block diagram illustrating in more detail the components of the general block diagram of FIGURE 1.
Figure 4A:
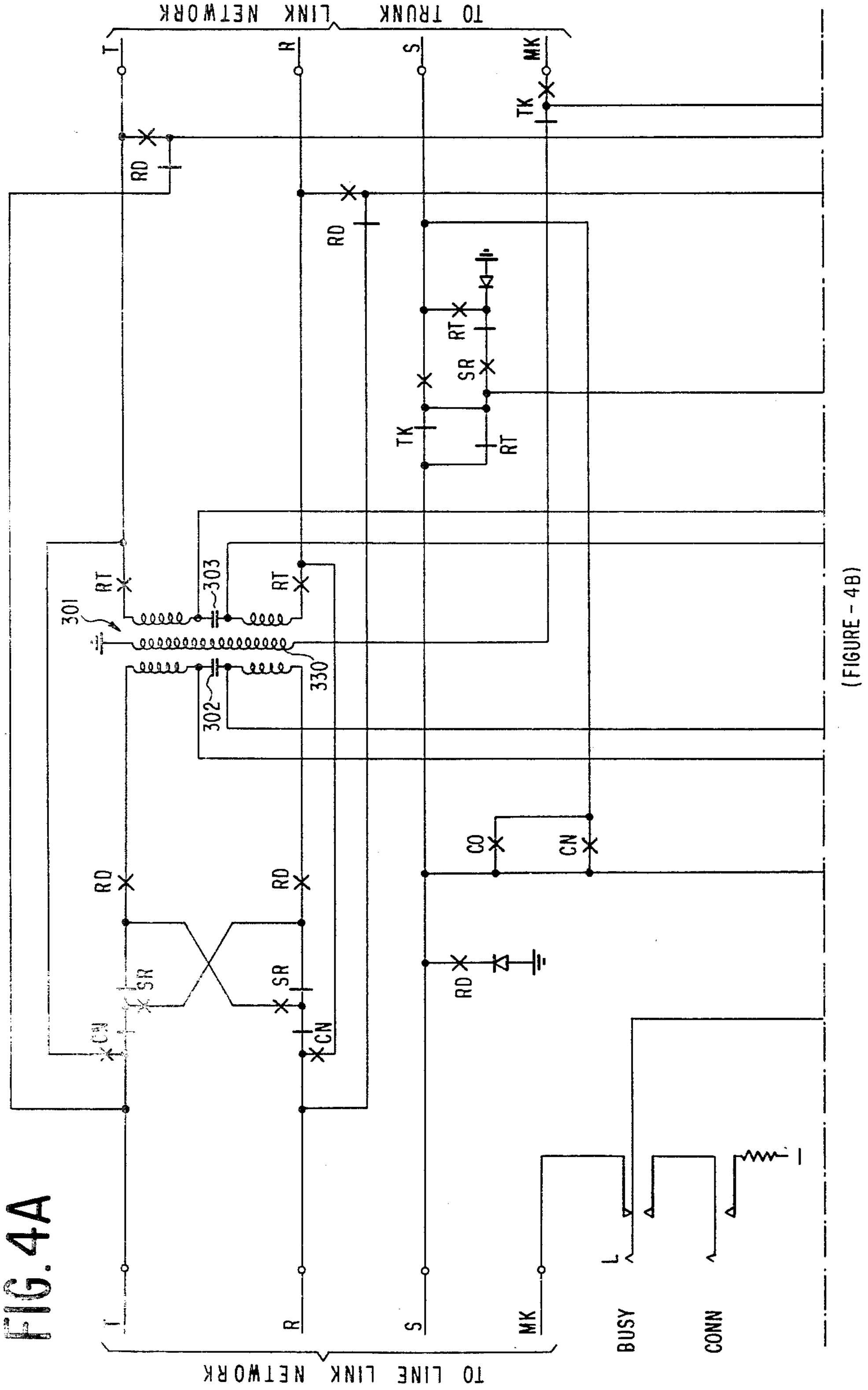
Figure 4B:
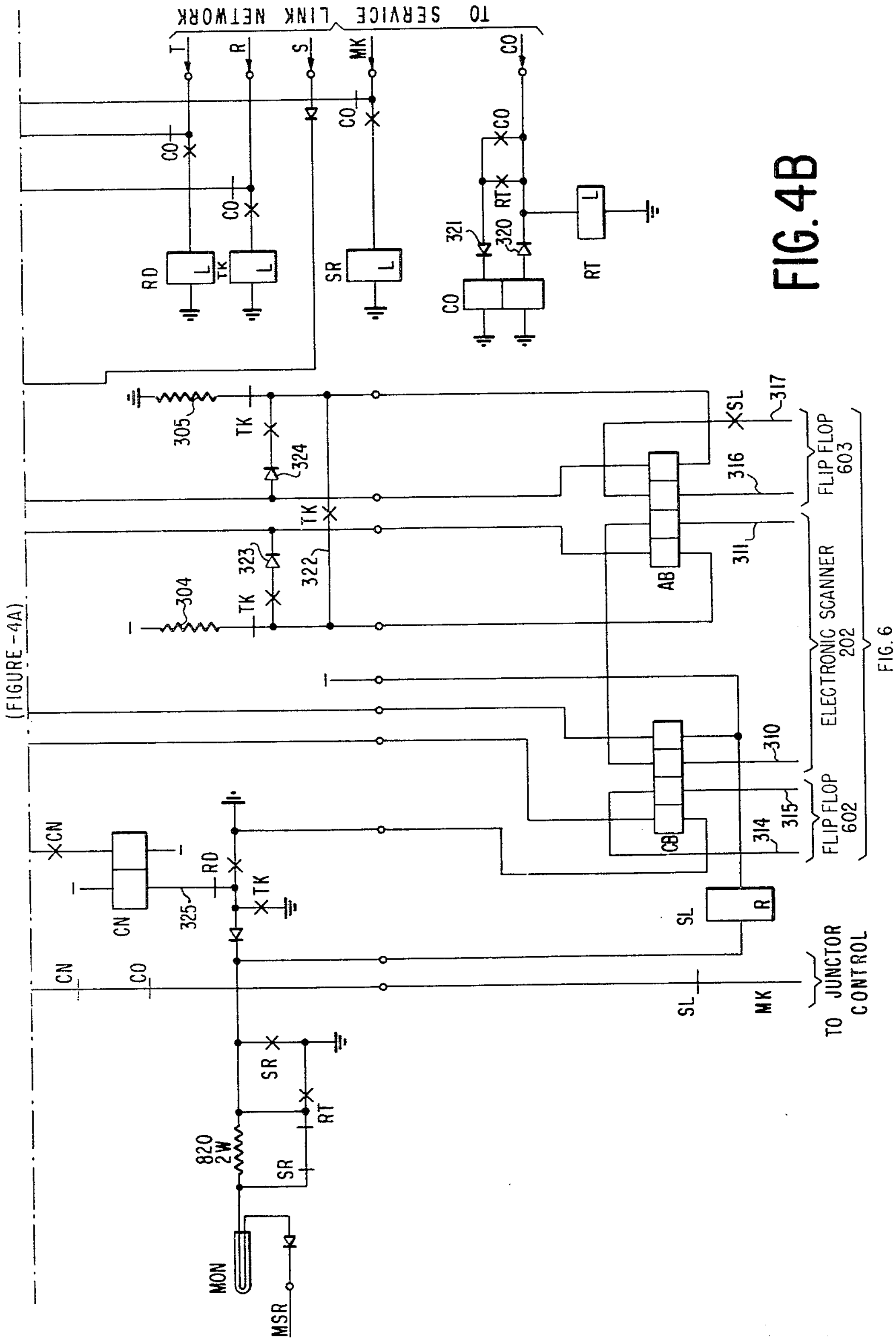
Figure 5:
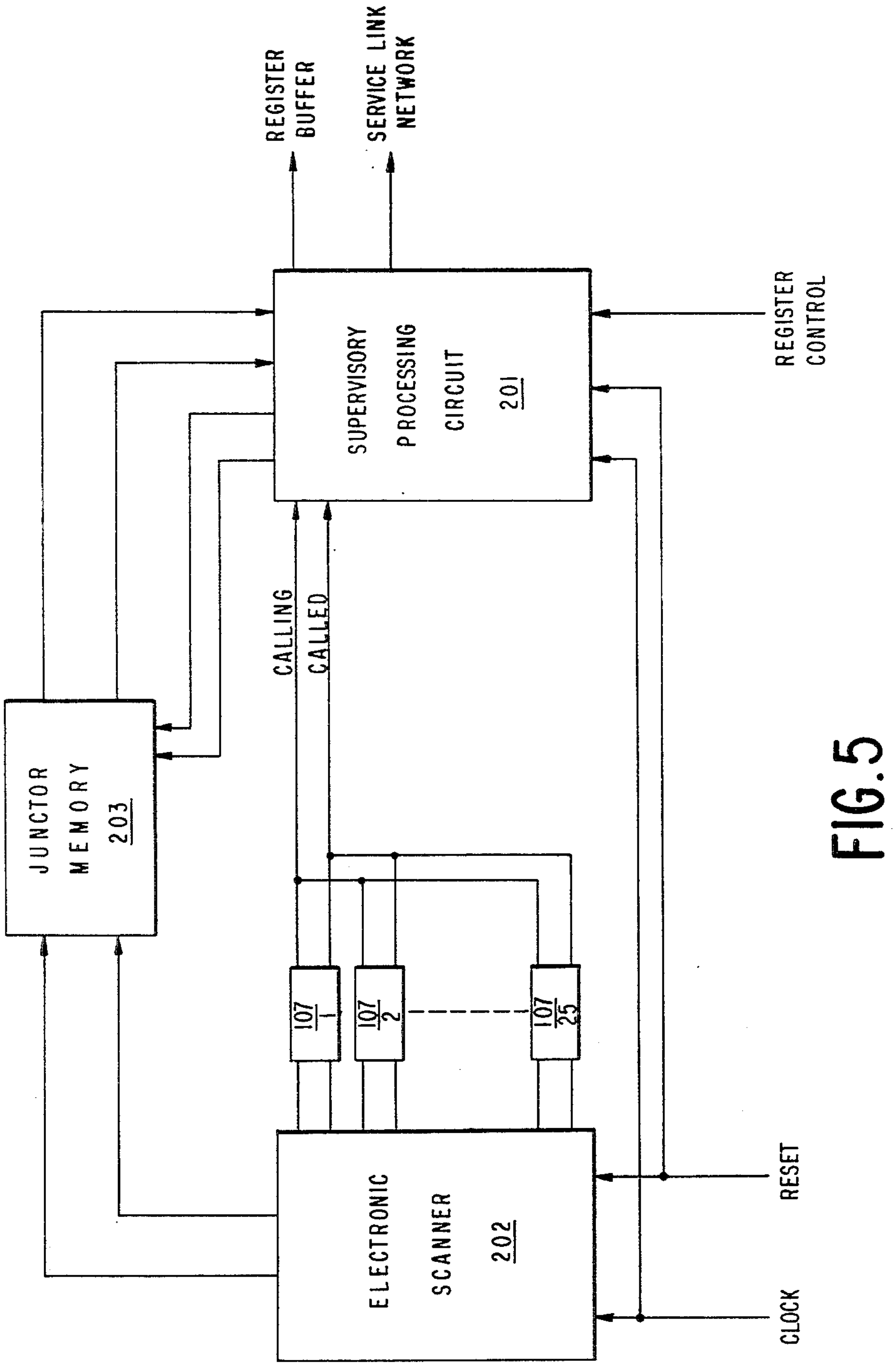
Figure 6:
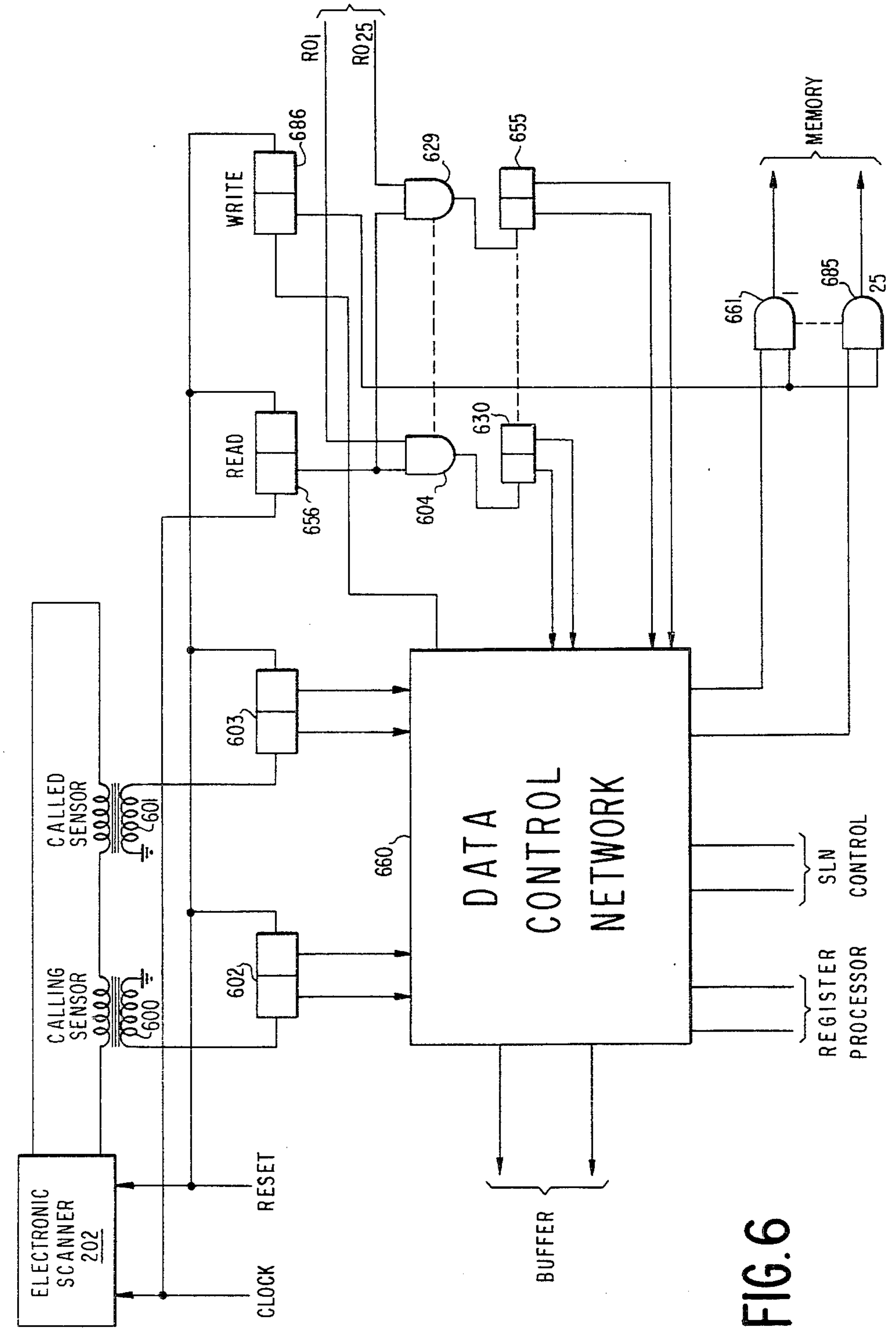
Figure 7A:
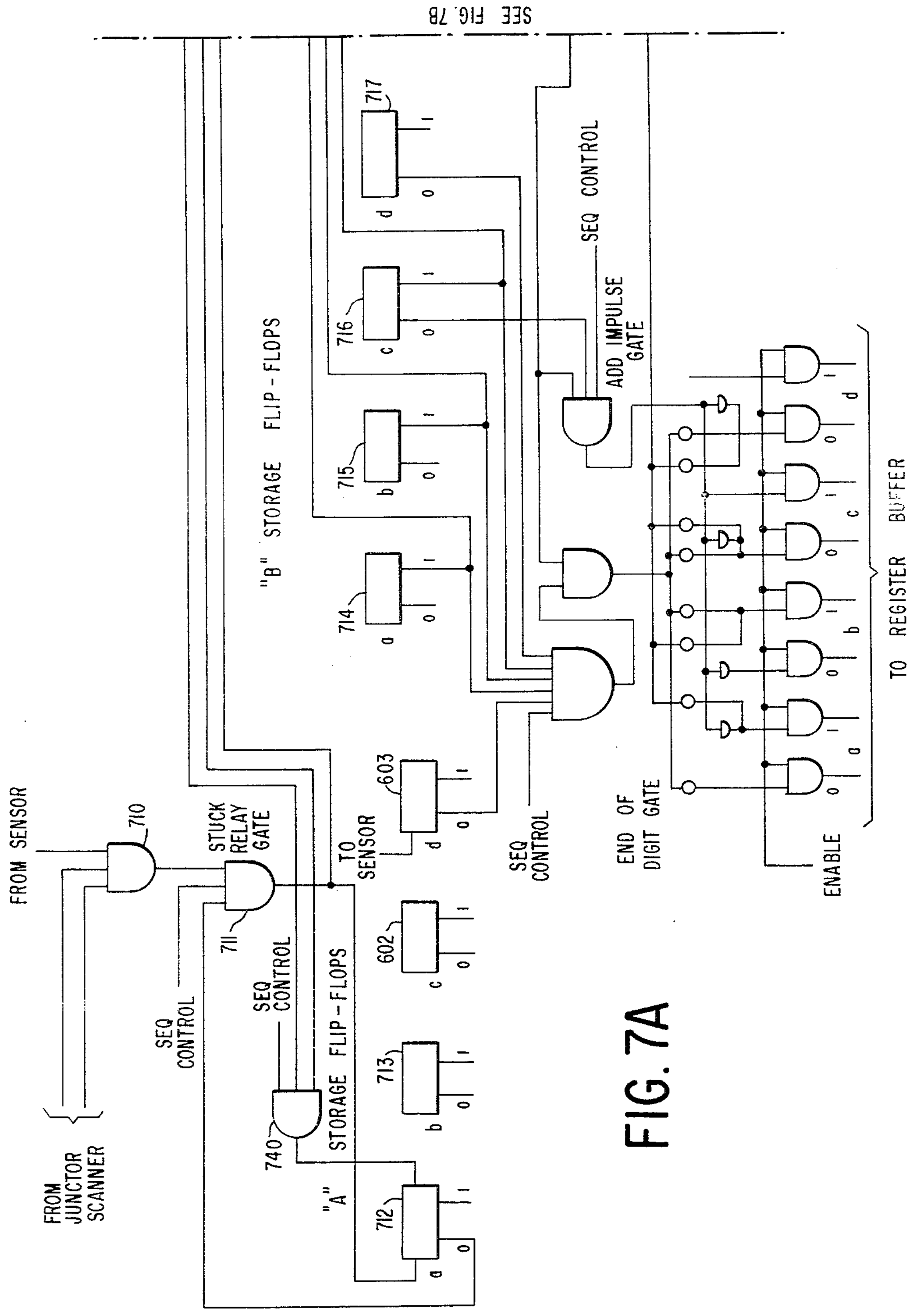
Figure 7B:
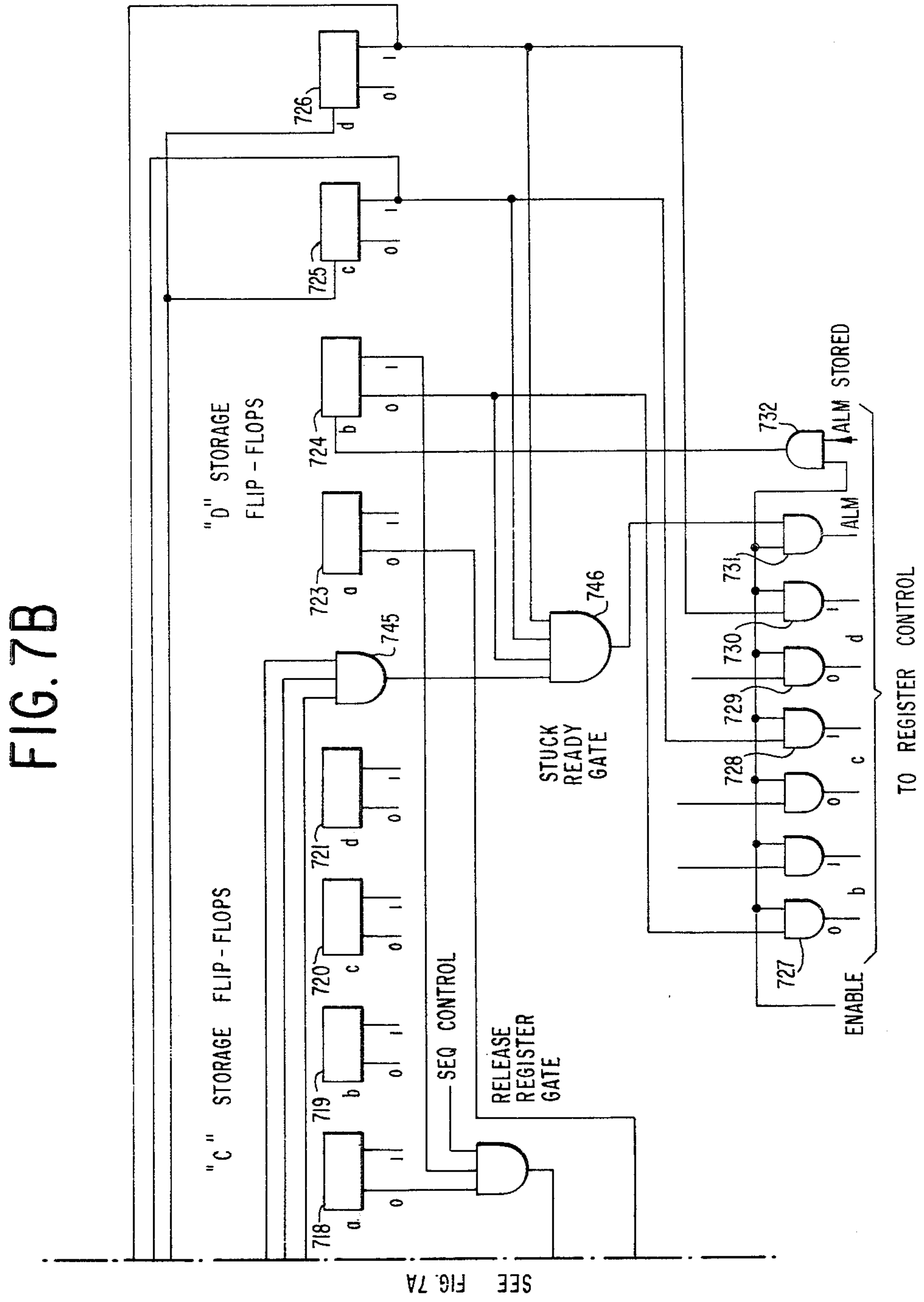
Figure 8:
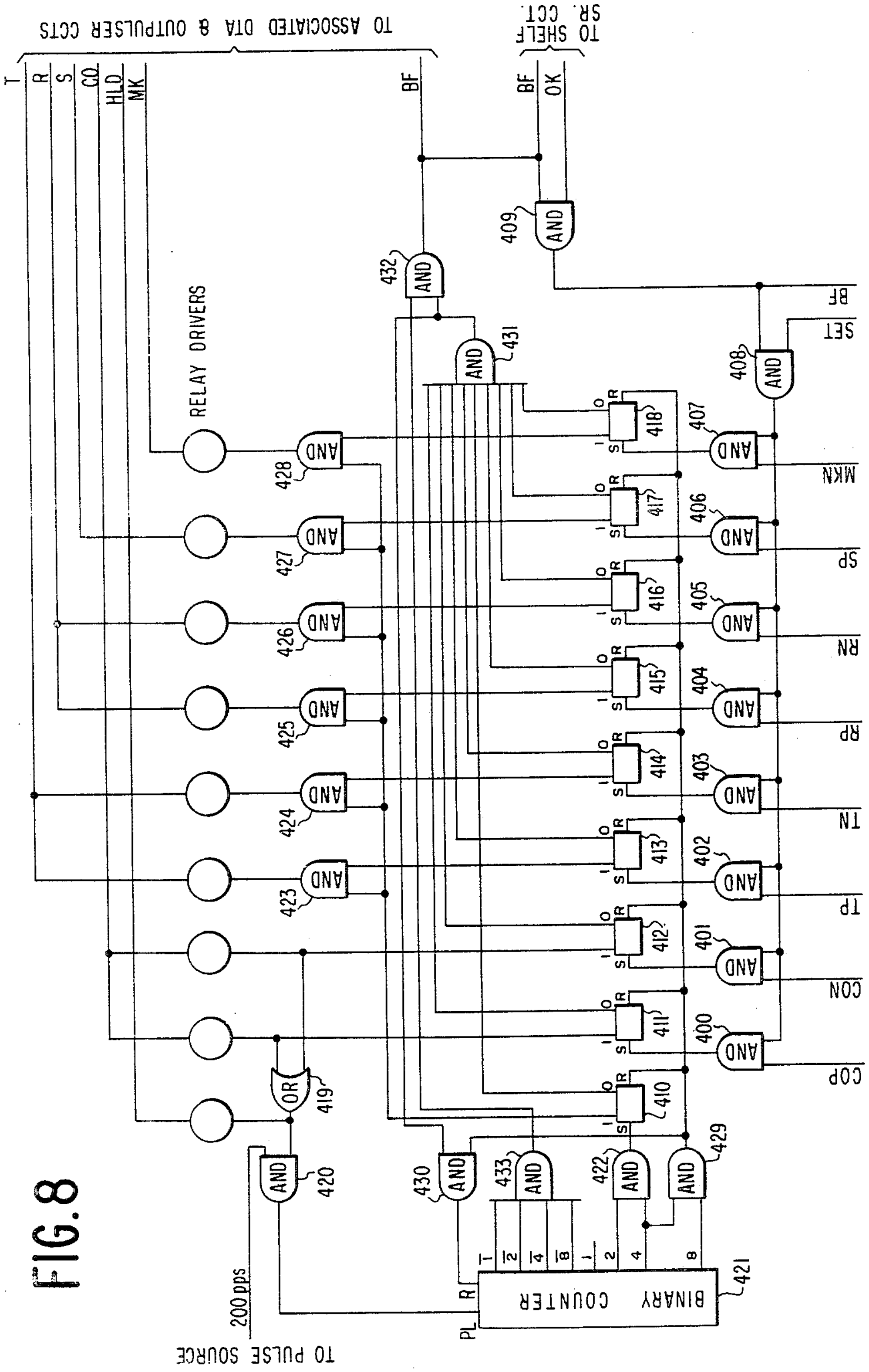
Figure 9:
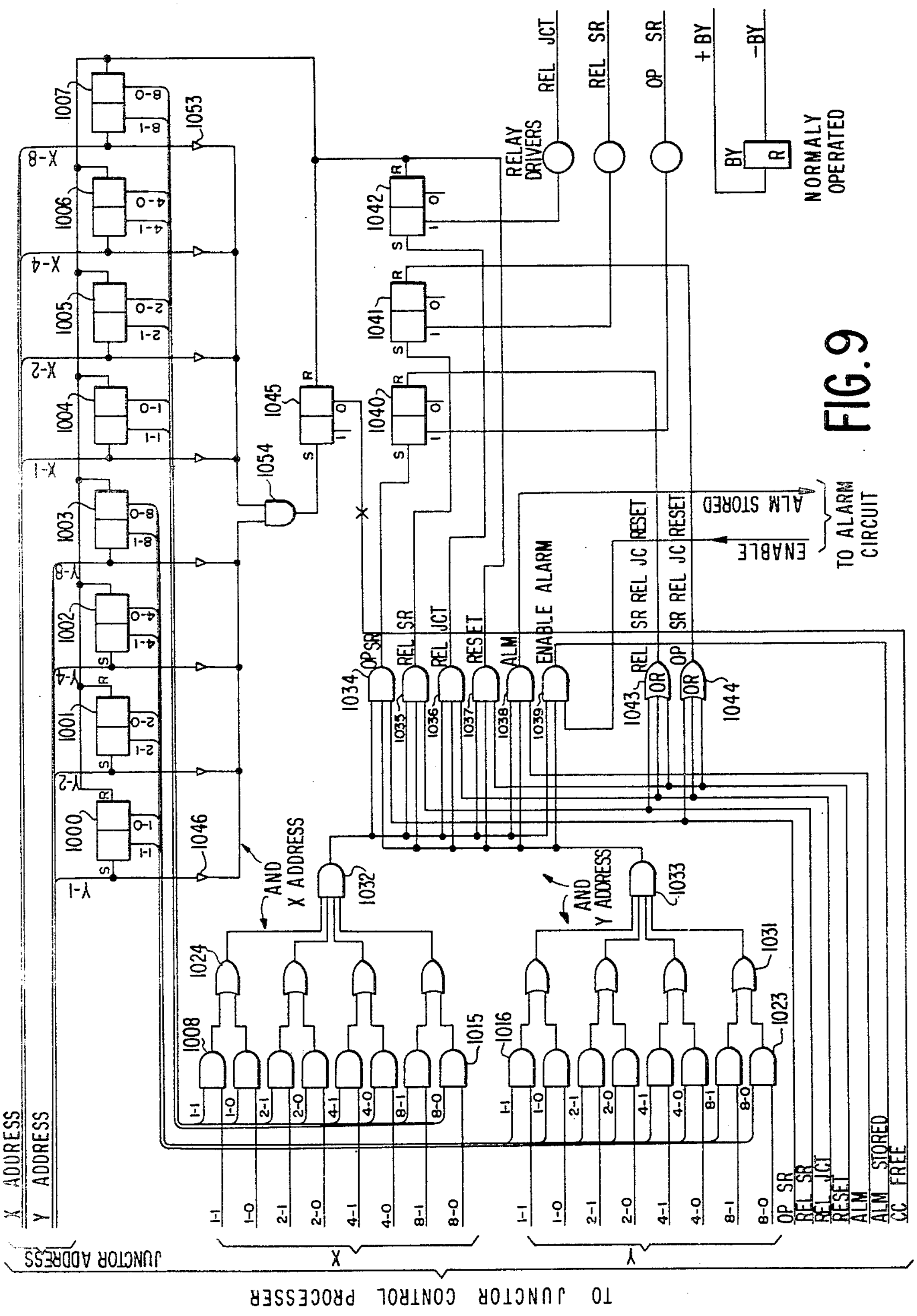

FIGURES 4A and 4B provide a circuit diagram of the junctor provided in the diagram of FIGURE 2;

FIGURE 5 is a general block diagram of the interrelationship between the plural junctors, junctor memory, scanner, and supervisory processing circuit;

FIGURE 6 is a general schematic diagram of the supervisory processing circuit;

FIGURES 7A and 7B are detailed diagrams of the part of the data control network of FIGURE 6 which pertains to the stuck relay alarm of the invention;

FIGURE 8 is a schematic diagram of the junctor control circuit;

FIGURE 9 is a schematic diagram of the junctor release circuit; and

Figure 10:
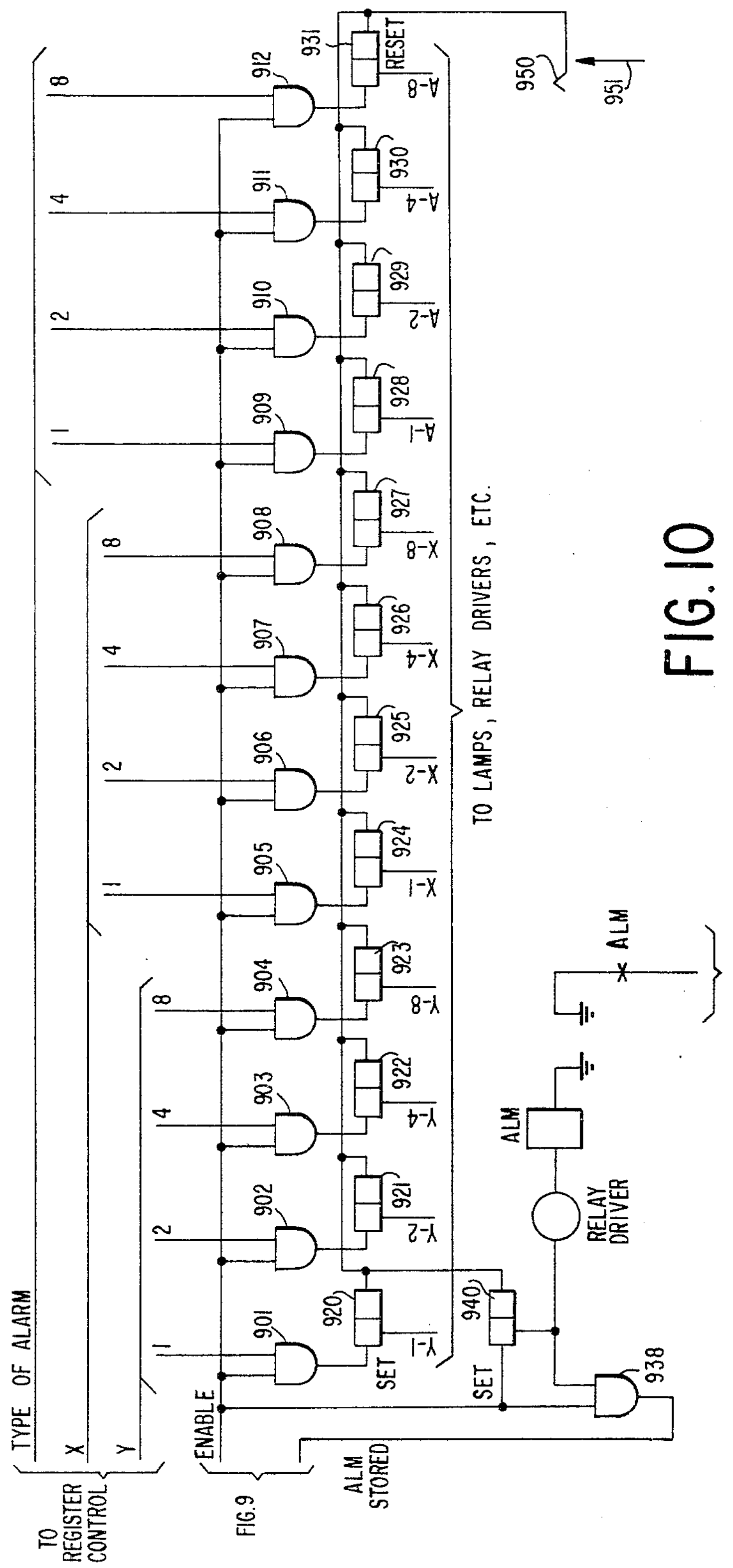

FIGURE 10 is a schematic diagram of an alarm circuit in accordance with the invention.

The stuck relay alarm circuit of the invention is described in the following detailed specification in conjunction with the universal junctor circuit set forth in the above-mentioned application of James G. Pearce et al.; however, it should be understood from the general principles of this invention described hereinafter that the invention may be applied to other circuits for similar purposes as described herein without necessitating the application of principles beyond those within the knowledge of the ordinary worker in the art.

Figure 1:
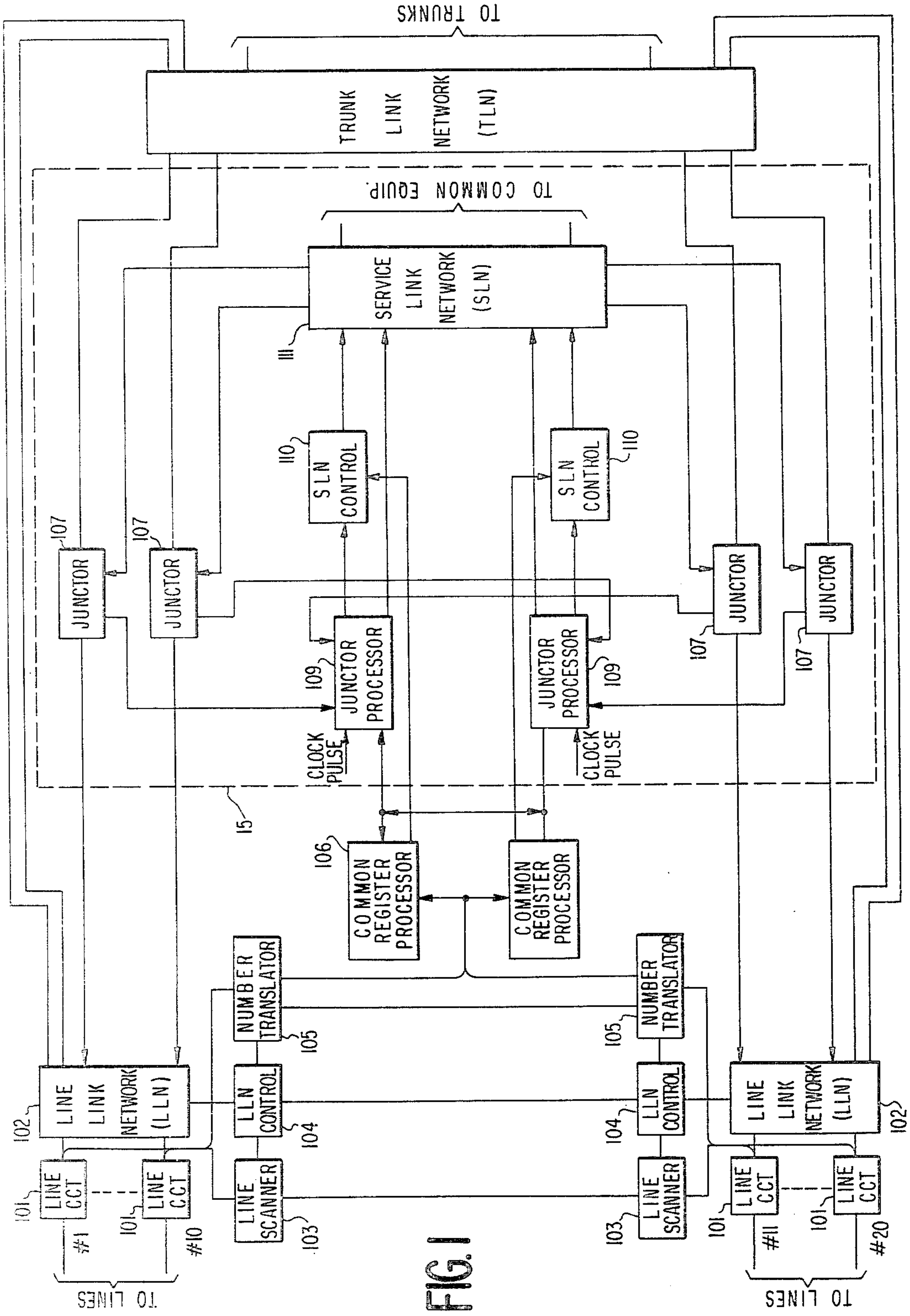
FIGURE 1 is a general block diagram of a telephone system into which the invention may be incorporated.

Referring first to FIGURE 1, there is illustrated a basic block diagram of a telephone system comprising a line link network 10 including a plurality of line circuits, a trunk line network 13 and either the same or a distant line link network 14 connected to the trunk line network. A register sender 11, such as disclosed in the application Ser. No. 300,557 of James G. Pearce et al., filed Aug. 7, 1963, for example, may be connected to the line link network 10 for acting during the initial stages of establishment of a call from a calling subscriber to provide proper routing information in response to dialed digits received through a universal junctor circuit 12 and a junctor control circuit 15, such as disclosed in the aforementioned application S.N. 552,283 of James Gordon Pearce et al., and to mark the calling and called line circuits, so that in cooperation with the junctor control 15 and universal junctor 12 a connection may be made therebetween.

A general block diagram of the common control circuit with which the invention may be utilized includes a single one of several junctors 107, and memory 203, to which is periodically connected a service link network 111 with its associated common service equipment, a service link network control 110, supervisory processing circuit 201, register buffer 205, register control 206, register memory 207, and number translator 105, as illustrated in FIGURE 2. The junctor circuit 107 provides an interface between the line link network 102, the trunk link network 108 and the service network which includes the service link network 111, the service link network control 110, the supervisory processing circuit 201, and the register control 206 and register memory 207 in the register sender 11. This junctor circuit 107 serves both as an originating and terminating junctor and is arranged so that it has no inherent decision-making circuitry and therefore is a slave to a processing control which obtains access to the calling and called line via the sensors in the junctor itself.

Each junctor 107 is connected to a supervisory processing circuit 201 on a time share basis by an electronic scanner 202 which simultaneously connects a junctor memory 203 to the supervisory processing circuit with the interconnection between the circuit elements being effected at the time when a segment of the memory 203 allocated to the particular junctor is available. This supervisory processing circuit 201 determines the condition of the line circuit by way of the sensors in the junctor 107 and compares this condition during each scan with the previous condition of the line circuit as stored in the junctor memory 203. Each of the junctors is scanned once every ten milliseconds so that a dialing impulse of 20 millisecond duration will be detected at least twice, thereby determining that a dialing impulse has been detected rather than a spurious signal such as an intermittent contact or other meaningless indication.

Figure 3:
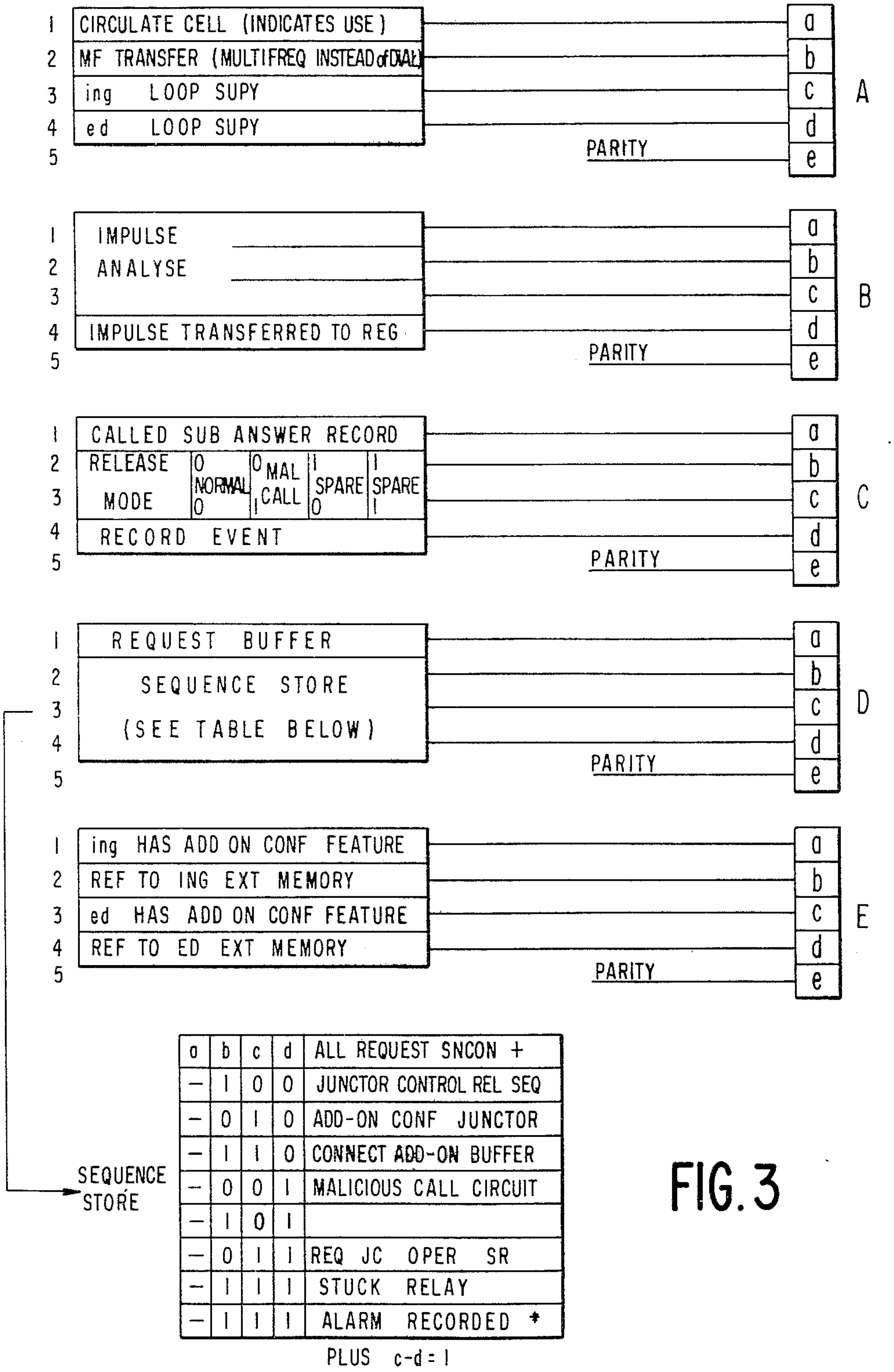
FIGURE 3 is a table indicating the allocation of the various information bits to particular subject matter.

The memory 203 will contain a segment for each junctor which is periodically connected to the associated supervisory processing circuit 201. In other words, there will be as many segments in the memory 203 as there are junctors 107 associated with a given supervisory processing circuit 201. The memory 203 may be either recirculating or random access and each segment of the memory typically contains 25 bits of information or instruction, as shown in FIGURE 3, although it should be understood that any convenient number of bits can in fact be used. The 25 bits of the memory are divided into five bit characters, of which the fifth or last bit of each character is provided as a parity or checking bit. The bit characters provide for a grouping of the bits into semi-related functions such as monitoring of the line circuits, timing functions, and various instructions utilized for control of the service network. The bits which make up each character within each segment of the memory are schematically disclosed in FIGURE 3. These characters may be regarded as subregisters for retaining binary bits which are continually being altered and which are a function of data derived from the particular junctor associated with that segment of the memory and data derived from the common register processor.

The first character A of FIGURE 3 of each segment is used to indicate that the segment is in use. A bit in position 1 in character A which represents a circulate cell indicates that the segment is in use, i.e., information is being received from the junctor, and permits the writing or manipulation of information in the other characters in the memory segment. If no such bit occurs in the first position, such as in a stuck relay condition, then information available to the memory is not recorded and no action is taken on such information, as will be described in greater detail hereinafter.

A bit in position 2 of the first character A indicates that transfer is multi-frequency instead of dial, as for instance, if the call is originating from a tone dial telephone. In a case of a bit in this second position, the supervisory processing circuit connects through the service link network control in the service link network to a multi-frequency signal detector 204 transferring the multi-frequency signals to this circuit element for translation and direct application to register control 206. Bits in positions 3 and 4 of character A of the memory segment indicate the state of the calling and called loops, respectively, a bit or "one" indicating an open line condition and a "zero" indicating a closed line condition. The fifth position of character A as in the other characters of the memory segment is reserved for the parity or checking bit, The second character B of the memory segment is used for impulse analyzing and controls the analysis of the durations of time for which the calling or called line is open or closed. Positions 1, 2 and 3 of character B provide for a three bit binary counting sequence. These three bits are used to keep a record of the length of time for which the calling loop is either open or closed. The method whereby this is achieved is as follows: At the particular interval of time during which a particular junctor is associated with the supervisory processing circuit 201 the state of the calling loop is recorded. Ten milliseconds later when the same junctor is again scanned the state of the loop is again examined. If the state is the same as it was previously the counter is stepped one and thereby records the fact that the loop is opened for a period long enough to constitute either an impulse or the final release conditions of the call. The discrimination between these two states is accomplished by reversing the function of the sensor and checking for a change of state of the calling loop from off-hook to on-hook. If the open circuit represents an impulse then the change of state of the loop will occur within a defined period. On the other hand, if the call has been terminated then no such change of state will be recorded and, hence, the counter will reach its maximum position as an indication of this. The three bits, therefore, keep a record of the time of opened or closed loop conditions.

The fourth position of character B of the memory segment provides indication of whether or not an impulse received by the junctor and sensed by the supervisory processing circuit has been transferred to the common register control 206. The fifth position of the character contains the parity bit.

Character C of each memory segment is utilized as a monitoring of line conditions and functions within the control system and also serves as a means for effecting release or connection of time shared equipment. At bit in the first position of character C is used to record the fact that the called subscribed has answered so that special sequences of events may be initiated which relate to functions required after the called party has answered. For example, a bit in the first position of character C indicating that interconnection between the calling and called subscribers has been completed, serves as a means for distinguishing impulses received over the calling or called lines as a flashing condition requiring recalling of time shared equipment, rather than a dialing condition which would require a different sequence of events. This first position of character C is also used to indicate that the called loop may instigate a release condition if the loop called remains open for greater than an assigned or predetermined period of time. The second and third positions in character C in each segment are used for release modes and control the manner in which the call can be released. For example, specific combinations of the two bits are allocated to a normal release (00) and to malicious call (01). The fourth position of the character C serves as a means of recording occurrence and completion of a sequence of events and provides a sort of scratch pad note to be made of this fact, which information is utilized in control of any following sequences. The fifth position of character C provides the parity or checking bit.

The fourth character D consists largely of a sequence store which determines what action has been taken by the processing circuit 201 when it has been seized. In addition, this sequence store is utilized to initiate a release stuck relay operation and record this condition, in accordance with the invention. The first position of this character is used for instruction purposes to request the buffer 205 for transferring impulses or information for the supervisory processing circuit to the register control 206. The second, third, and fourth positions of the character provide various combinations of bits which indicate various sequences which have been carried out by the control system. For example, indications that the signal network control has been seized, that a stuck relay alarm has been recorded, and either a junctor control is associated with the call in order to release the junctor, or that the signal control has to be seized and an add-on conference junctor connected through the service link network and the junctor to the transmission circuit, is indicated by the various bit combinations indicated as in FIGURE 3. In response to insertion of the bits from the supervisory processing circuit into the proper positions in character D requiring certain sequences, such as, operate stuck relay, control is effected through the service link network control and service link network to the various common circuits, which are available on a time share basis, for acquisition into the system at that time. The fifth position of the character D provides the parity or checking bit.

The character E contains basic information as to the classes of service of the calling and called subscribers with position 1 of the character indicating whether or not the calling party has add-on conference features, position 2 indicating the necessity to refer the calling party to an external memory in order, for example, to accommodate abbreviated dialing from a caller. Positions 3 and 4 of the character perform similar operations as positions 1 and 2 but refer to the called subscriber. Position 5 of the character provides the parity or checking bit.

Referring once again to FIGURE 2, the supervisory processing circuit 201 examines and acts upon the stored information in the memory and information received from the systems in the junctor 107 and as a result of this information it either connects to a register buffer 205 or to the service link network control 110. The service link network control 110 controls the crosspoints in the service link network 111 so as to interconnect the various common circuits with the junctor in control thereof. The register buffer 205 provides a means of associating the scanner, which is used for building up dialed digits, with the supervisory processing circuit and junctor memory operating on a time division multiplex basis with registers which store the digits and are provided on a traffic basis. In view of the asynchronous operation between the supervisory processing circuit 201 and the common register control 206 a speed buffer of some type is required in between the two circuits so that information may be transferred from the supervisory processing circuit 201 during a given scan of the junctor 107 and the junctor memory 203 with storage of the information or impulses in the register buffer 205 being provided until access is available to the register control 206.

The register control 206 performs timing and control functions and serves to transfer received impulses to the register sender system for further processing. Associated with the register control 206 on a time share basis is a register memory 207 and a dial tone applicator and outpulser circuit 208. The register memory 207 provides a segment for each of a plurality of dial tone applicators and outpulsers 208 and is capable of storing the address of the junctor associated with the outpulser circuit and retaining dial impulses for transfer via the register control 206 to the number translator 105 in the register sender.

The dial tone applicator and outpulser 208 controls the initial setting up of a call including application of dial tone and control of receipt of dialed impulses to the supervisory processing circuit in response to the register control 206. The register control 206 also provides control via the service link network control 110 and the service line network 111 of the various common circuits which are to be connected metallically through the junctor. Either the supervisory processing circuit 201 or the register control 206 are capable of effecting such a metallic connection between the common circuits and the junctor via the service link network control 110 and the service link network 111 in response to control functions set up in either of these circuits.

The common circuits which perform the necessary service control may include, for example, a junctor release control 209, a ringing control 210, a junctor control 211, multi-frequency signal detector 204, add-on conference bridge 212 and alarm circuit 214. However, it should be understood that other common circuits in addition to those specifically described and illustrated, such as a malicious call circuit, etc., may be provided in the system on a time share basis in the manner of the other common circuits. The common circuits may consist of an electronic or electromechanical portion, or of electromechanical portions only.

A brief description of the sequence of events and functions which make up the control procedure for setting up a call will provide a clearer understanding of the functions and relationships between the various circuit elements which are described above. At the time a call is originated, an available DTA circiut 208 and junctor 107 are each marked to indicate a seized condition and the address of the selected junctor 107 is inserted via the register control 206 into the register memory 207 in the segment therein reserved for the particular DTA 208 which is marked. An electronic scanner 213 is provided between the plurality of DTA circuits 208, the register control 206, and the register memory 207 so that the register control is connected in turn to each DTA circuit at the time which its particular segment of the register memory 207 is available to the register control 206.

The DTA and outpulser circuit 208 causes the calling line to be extended from the line link network 102 to the junctor 107. This enables the junctor sensors to detect the condition of the calling loop and by comparing the state of the loop with the previous state stored in the junctor memory 203, control can be effected via the register control 206, DTA and outpulser circuit 208 and junctor control 211 to apply dial tone through the service link network 111 and junctor 107 back to the calling subscriber.

The calling subscriber now dials and the supervisory processing circuit 201 connected to the sensors in the junctor 107 builds up the impulses and digits received and signals these to the register buffer 205. The register buffer has a means of storing the address of the junctor 107 which is transferring information at a given time. The buffer 205 therefore receives not only impulse information or instruction but also the junctor address so that upon comparison of the junctor address stored in a given segment of the register memory 207 with the address stored in the register buffer 205 by the register control 206, a transfer of the information in the register buffer 207 will be effected at the time when access is available to the segment in the memory to which the information is to be applied. The register control is arranged to scan the register buffer at regular intervals, and each time the register buffer 205 is checked against a given register memory segment, a check is made for the presence of the junctor address, which was stored when the register was first allotted to the connection, and if such an address identical to the memory segment is encountered, then the instruction character in the register buffer is transferred to the register control 206 and the register memory 207. In this way, the dialing pattern is processed by the supervisory processing circuit 201, analyzing on and off hook signals by measuring intervals in order to determine change of impulse and detect digits.

At any time that the change in condition of the line circuit is detected via the junctor sensors by the supervisory processing circuit 201 counting is initiated by a counter in the junctor memory 203 in character B thereof, bits 1, 2 and 3, to provide a means of monitoring and recording the time intervals between impulses and after control functions have been performed such as application of dial tone to a calling line, and also to determine an end of digit condition and a stuck relay condition. Whenever an impulse or an end of digit is recognized, then this information is transferred to the register control 206 together with the address of the junctor from which the information was received. When the register control has received a digit, reference is made to a translator 105 which determines whether the destination of the call is local or whether an outgoing trunk is required. The number translator 105 also provides indication as to whether or not the digit or digits received are sufficient to require further operations or whether or not additional digits will be necessary before further control will be required.

When the last digit of a local number has been received, control circuitry is utilized to determine whether the called line is busy or free. If it is found busy, the register control 206 with the dial tone applicator and outpulser 208 mark forward through the service link network, the calling junctor 107, and the trunk link network 108 to an available busy tone trunk 112. The calling line is then extended through the junctor 107 and the trunk link network 108 to the busy tone trunk 112 to return busy tone to the calling subscriber. At that time, the service link network 111, the dial tone applicator and outpulser 208 and register control 206 are released for use in connection with another call.

If a called number is found to be free after the last digit is received, the register control 206 effects connection of the ring control 210 through the service link network 111, the calling junctor 107 and the trunk link network 108 to the called subscriber equipment. The ringing code and class of service, if any, of the called subscriber are obtained from the register control via the number translator 105. At this point, the register control 206 and the dial tone applicator and outpulser 208 may be released. A metallic path has now been established from the ring control 210 via the cross points of the service link network 111, the junctor 107, the trunk link network 108, the line link network 102 to the called line, ringing is applied over this path to signal the called station and ring back is applied to the calling subscriber. When the called party answers the ringing is tripped, the transmission circuit is extended through the junctor 107 from the calling line to the called line, and the service link network 111 and ring control 210 are released. The called line sensor in the junctor 107 is now connected to the called line, except in metallic switch-through operations, and thus the supervisory processing circuit 201 can keep account of the state of both the called line loop and the calling line loop. The supervisory processing circuit now checks for flash or release from either the calling or called line; the flash in conjunction with the proper class of service of the flashing party as determined by the information stored in character E of the segment associated with the junctor 107 and the junctor memory 203 will permit connection of the junctor 107 via the service link network 111 to appropriate control circuits of trunks such as the add-on conference trunk 212 or malicious call trunk, etc., which are not shown.

With the supervisory processing circuit 201 continuously monitoring the condition of the calling and called line circuits, the opening of either of these line circuits indicating an "on hook" condition by either subscriber will be detected in the supervisory processing circuit which will then acquire the SLN control 110 and service link network 111 once again. When the opening of the calling line circuit is detected through the junctor 107 by the supervisory processing circuit 201, the SLN control 110 initiates the release sequence by the connection of the junctor release control 209 through the service link network to the junctor 207 thereby freeing the junctor and the remaining service equipment in a manner to be described in greater detail hereinafter.

THE JUNCTOR CIRCUIT

The junctor circuit provides both sensors for detecting the condition of the calling and called line circuits and suitable controls for connecting via the service link network 111 the common circuits which are necessary to effect service control for the system. This junctor additionally serves as both an originating and a terminating junctor incorporating a transformer bridge having a saturated inductor sensor in both the calling and called sides. The junctor circuit is arranged so that it has no inherent decision-making circuitry but is a slave to a processing control derived from the supervisory processing circuit and the register control. A schematic circuit diagram of the junctor circuit is illustrated in FIGURES 4A and 4B.

The main voice transmission path through the junctor is by way of the tip T and ring R leads from the line link network through the transformer bridge 301 to the trunk link network 108. A calling bridge CB in the form of a saturable core transformer has its input windings connected on either side of a DC isolation capacitor 302 in the calling side of the transmission bridge 301 with the opposite ends of the input windings connected to ground and negative DC respectively. Thus, upon closing of the calling line circuit, a DC path is completed from ground through the input windings of the calling bridge CB to negative DC voltage saturating the core of the transformer. Similarly, with an open condition of the line circuit, the path through the input windings of the calling bridge CB will be open and the core will remain unsaturated.

An answering bridge AB is provided on the called side of the transmission bridge 301 with its input windings connected on either side of the DC isolation capacitor 303 between ground potential and negative DC through the resistors 304 and 305, respectively. As in the calling bridge CB, a closed line circuit to the called subscriber will provide a closed path from ground through the input windings of the answering bridge AB to negative DC voltage saturating the core of the bridge while an open line circuit will provide no such complete path through the input windings, leaving the saturable core of the bridge in an unsaturated condition.

The condition of the calling and called line circuits connected to the junctor are monitored through an application of an interrogate or read pulse through the read windings of the calling bridge CB and the answering bridge AB, which windings are connected in series through leads 310 and 311 to the electronic scanner 202, which pulses these windings every 10 milliseconds to determine the condition thereof. If the calling or called line circuits are open an output pulse will be generated in the output windings and applied to the junctor supervisory processing circuit 201 via the leads 314 and 315 from the calling bridge or via leads 316 and 317 from the answering bridge, as the case may be. However, if a line circuit is closed, indicating an "off hook" condition, the core of the bridge associated with this line circuit will become saturated due to the closed circuit through the input windings of the bridge, and so application of an interrogate or read pulse to the input windings of the bridge will result in no signal output from the readout windings thereof. Thus, the condition of the line circuits is determined by the presence or absence of an output from the read-out windings of the calling bridge and answering bridge in response to continuous scanning or pulsing thereof.

The service link network 111 has five output leads, T, R, S, MK and CO over which the various control signals for effecting the functions associated with the junctor are transmitted. There are six main relays in the control portion of the junctor circuit, each providing a function or functions in response to control transmitted through the service link network 111. The change-over relay CO is a bipolar relay which permits double use of the control leads T, R and MK thereby making it possible to apply different control signals from the service link network to the junctor in a number in excess of the individual leads which interconnect these circuit elements. The change-over relay CO also provides a means for isolating the control leads T and R from the transmission lines T and R during control functions so as to prevent noise transmission along these transmission circuits. The remaining relays in the junctor are latching relays which require positive signals for resetting.

The relay RD which is connected through the control line T to the service link network serves as a means for placing a holding ground on the sleeve lead S back to the line link network and also connects the line link network to the calling side of the transmission bridge 301 to make possible a monitoring of this line by the supervisory processing circuit detecting sensors in the junctor. The relay SR which is connected through the control line MK to the service link network provides for a reversal of battery to the calling line circuit upon detection of an "off hook" condition at the called subscriber end of the system.

The relay RT connected to the control line CO to the service link network provides a holding ground forward toward the trunk link network on the sleeve lead S and also connects the line circuit of the called party to the transmission link 301 in the junctor so that a monitoring of the condition of this line circuit by the supervisory processing circuit through detection of sensors in the junctor can be effected. The relay RT shares this line with the change-over relay CO and operates in conjunction with this relay such that depending upon the polarity of the signal applied to the control lead, it is possible to either operate the change-over relay CO and the relay RT simultaneously or to effect operation of the change-over relay CO and release of the relay RT.

Each of the relays in the junctor is a latching relay with the exception of the relay CO, which is a bipolar relay, and each of these latching relays is set by a positive pulse and reset by a negative pulse. Thus, application of a negative pulse on the control lead CO will set the change-over relay CO via the rectifier 320, however, the RT relay will remain reset due to the polarity of this pulse. Once the relay CO has been set, a positive pulse can be applied to the lead CO which will pass through the rectifier 321 in view of the previously set condition of the relay CO and retain this setting of the bipolar relay, however, due to the polarity of this pulse, it will also set the relay RT this time. On the other hand, if the change-over relay is in the reset condition and a positive pulse is applied to the control line CO, the relay RT will first be set and then the relay CO will be set via the rectifier 321. In this way, it is possible depending upon the polarity of the control signal applied to the line CO to set only the relay CO, set both the relay CO and the relay RT, and set the relay RT and then the relay CO in consecutive order. Since the latter operation is substantially instantaneous, it is seen that the relay CO can be set any time with either a positive or negative pulse applied to the control line CO.

The relay TK connected to the control line R to the service link network provides a means of extending a dry loop toward the trunk link network thereby obviating the need for a trunk circuit when the outgoing trunks are dialable trunks. This is effected by connecting across the capacitor 303 on the called side of the transmission bridge 301 in the junctor by way of the lead 322 and the diodes 323 and 324. This effectively removes DC from the called side of the transmission bridge 301.

The relay CN provides a means of switching through metallically when the call is either to an outgoing trunk or from an ingoing trunk. This relay operates in conjunction with the relay TK, and like relay CO is a bipolar relay. When the relay TK is set, ground is applied to the relay CN via the unoperated contact of RD setting the relay via line 325. This connects the line 326 to the sleeve lead S which maintains a holding ground on the relay CN during the switch-through process.

The junctor also incorporates a winding 330 on the transmission bridge 301, which winding is connected via the control lead MK to the service link network and serves as a means of feeding dial tone or ring back tone toward the calling line on a transformer induced basis.

A relay SL is provided in accordance with the invention and serves as a stuck relay control which is operated whenever any of the latching relays in the junctor are operated, and at the time the junctor is freed from a transmission circuit this relay provides means for determining that one of the latching relays of the junctor has remained in the set condition. Under such condition, further access to this junctor can be prevented until it is determined whether or not the condition is due to a control function or whether it is due to a misfunction of one of the relays in the junctor circuit.

Under normal conditions when the junctor is not in use all of the latching relays will have been reset during the release junctor operation and the relay SL will therefore not be operated. Since the contacts of relay SL are inserted in series with the called sensor in the junctor, no readout signal can be received from this sensor with relay SL not operated, and so the regular scanning of unassigned junctor circuits will produce an output only from the calling sensor.

However, if one of the relays in the junctor has remained latched due to failure to receive a reset signal, mechanical failure, or other cause, the relay will produce an output from both the calling and called sensors in the junctor. This condition is detected by the supervisory processing circuit which initiates procedures to release the stuck relay and produce an alarm signal indicating a stuck relay condition if release of the stuck relay is unsuccessful. In any event the junctor is marked busy until the malfunction can be rectified. The procedures initiated by the supervisory processing circuit are discussed below.

SUPERVISORY PROCESSING CIRCUIT

FIGURE 5 shows a general arrangement of the supervisory processing circuit 201 which is time divided over a number of junctors so as to provide control for a plurality of calls at a given time. The time division is accomplished by a scanner circuit 202 which pulses into the calling and called sensors of each junctor in turn, which sensors are provided in conjunction with a saturated inductor so that whenever the calling or called loop is open an inductive coupling exists between the windings of the sensor, and hence, an output pulse occurs. When, however, current flows in either calling or called loops, then the transformer is saturated and little coupling exists so that a "zero" output pulse is derived therefrom. In this way, it is possible to build up a logic pattern of open and closed states on the sensor and thus detect impulses derived from the calling line. Since the scanner examines each junctor at regular intervals, it is possible to relate the state of the loop and the time of scanning with the record of the previous state of the loop, maintained in the junctor memory 203, which is available at each examination of the condition of the line to which the junctor is connected. This detection of line condition change plus existing line condition serves as means for initiating control functions via the register control 206.

Referring now to FIGURE 5, there is provided a schematic diagram of the switching arrangement between the supervisory processing circuit 201, the junctor memory 203, and the plurality of junctors 107 associated with these elements by means of the electronic scanner 202. The scanned 202 may comprise a chain counter or any other well known device for sequentially pulsing the interrogate windings in both the calling and called bridges of each of the junctures 107. This sequential scanning of the interrogate windings in the junctors 107, which may be carried out through use of a conventional scanner matrix in conjunction with a series counter arrangement, is effected in synchronism with a sweeping of the junctor memory 203 so that as each given cell associated with a given junctor is acquired in the junctor memory 203 a coordinate acquisition and connection of the junctor to the supervisory processing circuit 201 is effected under the control of the electronic scanner 202. The scanner is operated under control of a suitable clock signal and reset signal which are applied to the supervisory processing circuit 201 to effect coordinate control thereof. As will be indicated in greater detail hereinafter, the supervisory processing circuit 201 accepts information from the individual junctors scanned by the electronic scanner 202 and compares this information with the information in the junctor memory as to the previous condition of the line circuits connected to the junctor and this information along with data from the common register processors is used to update the junctor memory and also effect control of the various common circuits either through the service link network control 110 and service link network 111 or through the register buffer 205 and register control 206.

Referring now to FIGURE 6, which shows a schematic diagram of the supervisory processing circuit 201 with only one pair of called and calling sensors illustrated in the diagram so as to avoid the complication caused by illustration of duplicate equipment, it should be understood from the above mentioned description of FIGURE 2, that the sensors in the junctor are sequentially connected to the supervisory processing equipment so that at any given time only one pair of sensors from a single junctor will be connected to the circuit. FIGURE 6 schematically illustrates such a condition.

The read out windings 600 of the calling sensor and the read out winding 601 of the called sensor are connected respectively to flip flops 602 and 603, which devices are set by application of a pulse from the read out winding, but remain in the reset condition if due to the saturation of the core in the calling or called bridge no pulse is provided by the read out winding upon interrogation of the calling and called sensors. Thus, the set or reset condition of the flip flops 602 and 603 determine the condition or state of the calling and called line circuits, respectively. The clock pulses applied to the electronic scanner 202 serve to interrogate the sensors in each junctor once every 10 milliseconds so that a dialed impulse which is 20 milliseconds in length will be sensed at least twice during its duration by the supervisory processing circuit thereby insuring that the loop is closed or opened for a definite period of time before the condition is recognized as a distinct signal and not a bouncing contact.

The supervisory processing circuit includes a series of twenty-five AND gates 604 through 629 which individually receive a respective one of the twenty-five bits of information stored in the junctor memory 203 associated with the particular junctor which at that time is being scanned and apply these bits of information to a series of flip flops 630 through 655 upon coincidence at the AND gates 604–629 of a timing pulse from READ flip flop 656. The bits of information stored in the information 630–655 are applied to a data control network 660 which consists of an AND gate arrangement for combining the information provided in the junctor memory 203 with the updated information provided by the sensors in the junctor and data provided from the register processor 106. For example, during examination of the sensors in a given junctor the twenty-five bits of data in the junctor memory associated with this junctor are applied to the data control network 660 via the AND gates 604–629 and flip-flops 630–655. At the same time, any change in data present in the junctor memory and available through the register processor is also applied to the data control network. The AND gate arrangement in the data control network then provides a logical comparison between the previously stored data and the updated information provided from the junctor and the register processor and rewrites this information to provide a more correct representation of present conditions in the system.

Referring temporarily once again to FIGURE 3, the information in the character A, bits 3 and 4 representing the condition of the calling and called line circuits, respectively, from the memory could be compared with the data stored in flip flops 602 and 603 and detected changes in this condition would then be written into the memory at these locations by suitable AND gates. In addition, information for example in character A, bit 1, providing for a condition of the circulate call indicating use of the junctor and data for example in characters C, D and E which represent subscriber information provided by the translator via the processor, and also represent conditions in the system, would be supplied by the register processor to the data control network where it is compared with the data already written into the junctor memory so that a logical ANDing of the data will provide an updating of the information in the junctor memory. In character B, bits 1, 2 and 3 represent a counting sequence provided by the register processor so that during each scan the progress of the counter is applied to the data control network where it is then writting into the junctor memory. The result of the logical ANDing of the information provided from the junctor and the register processor with the data supplied from the junctor memory is applied through suitable outputs through AND gates 661–685 back to the junctor memory. The AND gates 661–685 are enabled by an output from WRITE flip flop 686 which is set as soon as all of the information applied to the data control network 660 has been processed by that network.

Due to the complexity of the logical arrangement of the AND gates and the data control network resulting necessarily from the combination of a multiple of twenty-five AND gates for insuring correct processing of the applied information, a detailed illustration of the data control network has not been provided. However, it should be sufficient for an understanding of this invention that the data control network 660 provides for a logical combination of the individual bits of information stored in the junctor memory with updated bits of similar information provided by the junctor and the register processor so as to correct or revise the information in the memory during each scan thereof.

Since certain data appearing in the junctor memory in addition to the data indicating the condition of the calling and called loops serve as means for initiating operation of various circuits in the system, the data resulting from the logical combination of information from the junctor, the register control 206 and previously stored information in the memory is not only written back into the memory, but appropriate bits of information are also transferred via the register buffer 205 to the register control 206 in the register sender 11. The register control 206 stores this information in the register memory 207 and also utilizes this information to control the various common circuits required for a particular function. This output data is also applied from the data control network 660 directly through the service link network control 110 to the service link network 111 where it may act directly upon certain of the common circuits associated therewith.

A portion of the data control network 660 (FIGURE 6) which pertains to the stuck relay alarm circuit of the invention is illustrated in FIGURES 7A and 7B. Storage flip flops 712, 713, 602 and 603 are provided for storage of the character A information for the junctor memory. In a like manner, flip flops 714–717, 718–721, and 723–726 are provided for storage of the information representing characters B, C and D of the junctor memory, respectively. The storage flip flops provided in the data control network 660 for storage of the information relating to character E of the junctor memory have been omitted from FIGS. 7A and 7B since they do not relate in any way to the functioning of the stuck relay alarm circuit in accordance with the invention. The individual flip flops relating to each character in the junctor memory relate to the individual bits of information for which they are provided as designated in FIGURE 3.

An AND gate 710 is connected to the called sensor in the junctor memory and to the electronic scanner 202 so that the gate provides an output when scanned in coincidence with receipt of a read out signal from the sensor, which output is applied to a stuck relay AND gate 711. The AND gate 711 is enabled by coincidence signals from AND gate 710, a timing signal from sequence control and the "0" output from flip flop 712 indicating the reset condition of the flip flop which occurs upon release of the junctor from the transmission circuit.

As indicated above, under normal conditions with the junctor released from the transmission circuit, the SL relay will not be operated since each of the latching relays in the junctor will have been reset during the release operation, and the regular scanning of unassigned junctor circuits will produce an output only from the calling sensor. However, if one of the relays has been locked up inadvertently, the relay SL will remain in the operated condition and the scanner will produce an output from the called sensor which will pass AND gate 710, in coincidence with signals from the electronic scanner 202.

Presence of a signal in the output of AND gate 710 indicating that a read out signal has been received from the called sensor is compared with the condition of the storage flip-flop 712 indicating the status of the junctor. If the junctor is associated with a transmission circuit and is receiving information, a bit will be present in the circulate cell as represented by the set condition of flip flop 712. Under these circumstances, the signal applied to the AND gate 711 serving as a stuck relay gate will be inhibited since the relay SL is properly in the operated condition. However, if the storage flip flop 712 is in the reset condition and a signal is applied to AND gate 711 from gate 710, a condition exists where one of the latching relays in the junctor improperly remains in its set condition. This coincidence of signals at AND gate 711 in combination with the application of a timing signal from sequence control will enable AND gate 711 applying a signal to set the flip flop 712 and to also set the flip flops 725 and 726 in the storage flip flops associated with character D of the memory. At the same time, due to the presence of the break contact of the SL relay in the marking circuit MK in the junctor, the junctor will be prevented from seizure for use in association with a transmission circuit until the malfunction can be investigated and corrected.

With the storage flip flops 725 and 726 in the set condition, the output (011) will be applied to coupling gates 727, 728 and 730, which upon receipt of an enable signal from the register buffer 205 will effect a transfer of this signal to the register buffer and then to the register control 206 representing a request that the junctor relay be operated to relieve the set condition thereof. The signals applied to the junctor via the service link network 111 are generated in the junctor relay control 211 under instruction from the register control 206.

JUNCTOR RELAY CONTROL

The junctor relay control illustrated in detail in FIGURE 8 is utilized in combination with the dial tone applicator and out pulser circuit 208 to control the junctor relays during the initial stages of setting up a call and also controls the junctor circuit in response to the register control 206 and supervisory processing circuit 201 to set up the necessary switching combination in the junctor circuit for effecting operations during a call and upon termination thereof and also provides signals to the junctor in an attempt to relieve a stuck relay condition. There are preferably two junctor relay control circuits provided in the system for the plurality of dial tone applicator and out pulser circuits 208, which make use of the two junctor relay controls on a time share basis. Of course, additional junctor relay control circuits, or only one circuit may be provided without departing from the spirit and scope of the instant invention in accordance with the requirements of the overall system.

As soon as "a request junctor operate stuck relay" signal is received in the register control 206, a sequence of events is initiated under control of the register control 206 which results in the application of relay actuating signals to the junctor in question. This sequence of events is programmed in the register control 206 which supplies the control signals, in the proper timed sequence via the junctor relay control 211 and dial tone applicator and out pulser circuit 208 through the service link 111 to the proper relays in the junctor 107 for effecting this operation. The junctor relay control signals are applied from the common register control 206 to the junctor relay control 211 at input AND gates 400 through 407, as seen in the detailed circuit diagram of FIGURE 8. The input control signals include CO positive and negative (COP and CON) signals, T positive and negative (TP and TN signals), R positive and negative (RP and RN) signals, S positive (SP) and MK negative (MKN signals). The manner in which certain of these control signals are utilized to effect actuation of the proper relays in the junctor 107 to perform the desired functions for setting up a call relate to features not forming a specific part of the invention and may be determined from the aforementioned application of James Gordon Pearce et al. in connection with the dial tone applicator and outpulser circuit 208.

The AND gates 400 through 407 are enabled by the output signal from AND gate 408 which is controlled by a set signal SET and a signal BF from the programmer in the common register processor 106. The signal BF for enabling the AND gate 408 may also be derived from the output of AND gate 409 as will be described in greater detail hereinafter. The control signals from the register control 206 are applied through the enabled input AND gates 400 through 407 to respective input flip flops 411 through 418, which are set by application of the control signals thereto. The outputs of flip flops 413 through 418 are applied to AND gates 423 through 428, respectively, which in turn place these control signals on the lines T, R, S, CO, HLD and MK respectively, to the associated dial tone applicator and out pulser circuit 208 to which the junctor relay control circuit is connected.

The enabling of the AND gates 423 through 428 so as to permit the control signals from the common register processor 106 to pass through to the dial tone applicator and out pulser circuit is effected under a timed sequence controlled by a binary counter 421 which is started through application of a start signal PL upon coincidence of a timing pulse from a 200 pulse per second source and either of the signals COP or CON applied via respective flip flops 411 and 412 through OR gate 419 to AND gate 420. The timed order of operation provided by the binary counter 421 is necessary during normal use of the junctor to insure that prior to application of control pulses from the junctor relay control through the dial tone applicator and out pulser circuit and service link network to the junctor, the relay CO in the junctor is set either by a control signal COP or CON from the common register processor 106 so that initially the tip T and ring R transmission lines in the junctor to the trunk link network are isolated from the corresponding T and R control lines connected to the service link network, thereby preventing feedback of the control impulses from the relays to the transmission line. However, it is not essential for the stuck relay condition since the junctor is not connected at this time to a line circuit.

Thus, as soon as the control signal COP or CON is applied to its respective AND gate 400 or 401, this control signal is immediately applied to the dial tone applicator and out pulser circuit 208 to set the relay CO in a junctor via the service link network and also, at the same time, is applied through OR gate 419 to AND gate 420, whereupon coincidence with a pulse from the pulse source connected to the AND gate applies the start signal PL to the binary counter 421. The binary counter 421 then begins its binary count until it reaches a count of six (0110) which enables the AND gate 422 applying a start signal to the flip flop 410. With the setting of flip flop 410, the AND gates 423–428 are enabled in coincidence with the control signals applied via flip flops 413 through 418 and a control signal is applied to each of the output control lines T, R, S, CO and MK through the dial tone applicator and outpulser circuit to the junctor 107 to reset each of the relays in the junctor, if possible.

The binary counter 421 continues its binary count until it reaches a count of 12 (1100) at which time the AND gate 429 is enabled providing an output signal which resets each of the flip flops 410 through 418. The reset condition of the flip flops is then detected by AND gate 431 providing an output signal to AND gate 430 in coincidence with the output of AND gate 429 which resets the binary counter. This reset condition of the counter and the flip flops is also monitored at AND gate 432 which then indicates the free condition of the junctor relay control and enables its use immediately in conjunction with another dial tone applicator and out pulser circuit.

If the relay functions generated in the junctor control 211 and applied to the junctor via the service link network 111 are successful in resetting all of the relays in the junctor to eliminate the stuck relay condition, the output from the called sensor will disappear with the resetting of the relay SL so that upon the next scan of the gate 710 in the supervisory processing circuit (FIGS. 7A and 7B) no output will be produced to enable the stuck relay gate 711.

In addition to connection of the storage flip flops 725 and 726 to the coupling gates 728 and 730, these outputs are alos applied to an AND gate 740 which serves as an alarm persistence check gate. Coincidence of signals from the flip flops 725 and 726 indicating the set condition thereof at the gate 740 with a timing signal from sequence control, which is received prior to the next scan of the sensors in the junctor will produce an output which is applied to reset the storage flip flop 712 removing the bit from the circulate cell and once again providing indication that the junctor is no longer associated with a transmission circuit. If under these conditions the resetting of all the relays in the junctor has been successful, all information relating to the stuck relay condition will have been removed from the system and the storage flip flops will be reset at that time by the timing signals from the sequence control.

If, however, the application of relay functions, from the junctor control 211 to the junctor has been unsuccessful in eliminating the stuck relay condition, the next scan of the junctor will produce a read out signal enabling gate 710 and once again placing a bit in the circulate cell represented by the set condition of flip flop 712. As indicated above in connection with the normal operation of the supervisory processing circuit, the second consecutive read out from the junctor as indicated by the recurring bit in the circulate cell initiates the counting sequence in connection with character B, which provides a count of the length of time for the called subscriber on-hook condition. This ultimately results in the setting of each of storage flip flops 714, 715, and 716, representing count (1110). This condition in conjunction with the release stuck relay signal from the character D represented by storage flip flops 724, 725, and 726 will be sufficient to produce an alarm signal through enabling of AND gates 745 and 746.

The AND gate 745 is connected to the output of each of the storage flip flops 714, 715 and 716 and is enabled upon receipt of signals therefrom representing a timing sequence (1110). The AND gate 746 which represents a stuck relay alarm gate receives inputs from the flip flops 724, 725 and 726 in coincidence with the signal from AND gate 745 to produce an output which is applied to the alarm AND gate 731, which forms part of the coupling gate connected to the register buffer 205. Upon receipt of an enable signal from the register buffer 206, the alarm signal is then applied therethrough to the register control 206.

At the time that a "release stuck relay" signal is applied to the register control 206, a dial tone applicator and out pulser circuit 208, junctor release control circuit 209, and junctor control circuit 211 are acquired by the register control and the address of the junctor 107 is stored in the register memory 207. This address along with the alarm signal provided by the supervisory processing circuit 201 is applied to the junctor release control circuit 209, illustrated in part in FIGURE 9, from the register control 206.

The X and Y portion of the junctor addresses associated with the junctor exhibiting the stuck relay condition is applied via the service link network control 110 and service link network 111 to input address flip flops 1000–1007 in the junctor release control (FIG. 9), which in accordance with the set or reset condition determine the address of the junctor to be associated therewith. The junctor address stored in the register memory 207 along with the alarm signal is applied via the service link network control 110 and service link network 111 to input coincidence AND gates 1008–1015 and 1016–1023 to which the set-reset outputs of the flip flops 1000–1007 are also applied.

A coincidence between the two addresses at the coincidence signal AND gates 1008–1023 enables these AND gates providing a coincidence signal via the OR gates 1024–1031 to control AND gates 1032 and 1033 controlling the X and Y portions of the address, respectively. The flip flops 1032 and 1033 and the outputs of AND gates 1008–1015 and 1016–1023, respectively, apply any control signals from the register control 206 to respective instruction AND gates 1034–1039.

In the case of a stuck relay condition, the alarm signal is applied to the input of instruction AND gate 1038, which upon coincidence of the addresses from the junctor and from the register memory apply an alarm stored signal to the alarm circuit 214. This alarm stored signal serves to enable the alarm circuit and also is returned as an enable signal to instruction AND gates 1039 which provides an alarm stored signal for transfer back to the supervisory processing circuit 201 at AND gate 732. The enabling of AND gate 732 serves to set storage flip flop 724 so as to provide a sequence storage indication in character D of the memory representing a stuck relay alarm recorded condition. This serves to prevent further action on the part of the supervisory processing circuit with respect to actuation of the alarm circuit.

An alarm circuit which is designed to provide an audible, visible, or recorded indication of a stuck relay condition, or any combination of these indications, is provided in accordance with the instant invention and illustrated in FIGURE 10.

The X and Y address of the junctor exhibiting the stuck relay condition are applied from the register control 206 to the junctor alarm circuit at input AND gates 905–908 and 901–904, respectively. The input AND gates 901–908 in turn serve to set flip flops 920–927 to store the address of the junctor until an alarm signal is received from the junctor release control 209. In addition to the junctor address, provision is made for application from the register control 206 of a binary designation of the type of alarm which is to be provided. This binary designation is applied to input AND gates 909–912 for storage in flip flops 928–931. The information applied to the input AND gates 901–912 is transferred to the storage flip flops 920–

931 through application of an enable signal to the input AND gates, which enable signal is represented by the alarm signal transferred from the junctor release control 209.

The enable signal also serves to set flip flop 940 providing for actuation of the alarm relay ALM which completes the alarm circuit providing an alarm energizing signal. With actuation of the alarm relay ALM, the AND gate 938 will be enabled in coincidence with the enable signal from the junctor release control to provide the alarm stored signal which is transferred back through the junctor release control 209 and register control 206 to the superivsory processing circuit to prevent further action on the part of this circuit in connection with the stuck relay condition. The outputs from the storage flip flops 920–931 serve to energize lamps, relay drivers, recorders, or audible alarm devices in combination with the alarm enable signal generated through energization of the alarm relay ALM. The alarm condition may then be released through manual resetting of the flip flops 920–931 by means of contacts 950 and 951.

While we have shown and described several embodiments in accordance with the instant invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. In combination with a control relay arrangement including a plurality of relays available on a time share basis for use in a time division multiplex system, register means for controlling actuation of said relays and sensing means for detecting a condition of said multiplex system, a stuck relay alarm circuit comprising control means connected to each of said relays for enabling said sensing means upon actuation of any one of said relays, first storage means for recording and storing the condition wherein said control relay arrangement is in operative association with said multiplex system, gate means producing a control impulse in response to enabling of said sensing means in coincidence with an indication by said storage means of lack of operative association of said control relay arrangement with said multiplex system, and second storage means responsive to said control impulse for actuating said register means to apply control signals to reset each of said relays.

2. The combination defined in claim 1 further including additional gate means responsive to said second storage means for resetting said first storage means to indicate lack of operative association of said control relay arrangement with said multiplex system, said control impulse being applied to said first storage means for setting thereof to indicate operative association between said control relay arrangement and said multiplex system.

3. The combination defined in claim 2 further including a binary counter capable of stepping to a predetermined count, and means responsive to repeated setting of said first storage means for initiating operation of said counter to step to said predetermined count.

4. The combination defined in claim 3 further including alarm gate means responsive to said predetermined count of said counter in coincidence with actuation of said register means by said second storage means for producing an alarm signal.

5. The combination defined in claim 4 wherein said first storage means is in the form of a flip-flop having set and reset states representing association and lack of association, respectively, of said control relay arrangement with said multiplex system.

6. The combination defined in claim 5 wherein said second storage means includes a plurality of flip-flops settable to a plurality of binary combinations, and means for applying said control impulse to selective ones of said flip-flops to set the binary state of said second storage means to a combination indicating a stuck relay condition requiring resetting of said relays in said control relay arrangement.

7. The combination defined in claim 6 wherein said alarm gate means includes a first AND gate connected to the outputs of said binary counter for producing an actuating signal in response to an output from said counter representing said predetermined count and a second AND gate for producing said alarm signal upon coincident receipt of said actuating signal and the output from said second storage means representing a combination indicating a stuck relay condition.

8. The combination defined in claim 1 further including circuit means indicating the busy or free condition of said control relay arrangement, said control means being operatively connected to said circuit means to indicate a busy condition of said control relay arrangement thereby in response to actuation of said control means.

9. The combination defined in claim 7 wherein said control relay arrangement is in the form of junctor means for effecting interconnection between calling and called line circuits in a telephone communication system, said sensing means being provided to monitor said line circuits at periodic intervals.

10. In a time division multiplex telephone communication system having a supervisory control system including junctor means for interconnecting calling and called line circuits and register means for operatively associating said junctor means with said line circuits, said junctor means including sensing means periodically connected to at least said called line circuit for detecting a condition thereof and a plurality of relays operated by said register means for connecting supervisory equipment to said line circuits, a stuck relay alarm circuit comprising stuck relay means connected to each of said relays for enabling said sensing means in response to actuation of any one of said relays, and control means responsive to enabling of said sensing means, in the absence of operative association of said junctor means with said called line circuit by said register means for applying a plurality of control signals to said register means, said register means effecting a resetting of the relays in said junctor means in response to receipt of said control signals.

11. The combination defined in claim 10 further including first storage means having set and reset states representing the conditions of operative association and lack of operative association of said junctor means with said line circuit, respectively, said control means producing a control inpulse upon coincident receipt of a signal from said sensing means and a signal from said first storage means indicating the reset state thereof.

12. The combination defined in claim 11 further including second storage means providing a plurality of signal combinations representing different binary states for initiating a plurality of functions corresponding thereto in said register means and means for applying said control impulse to set said first storage means and for applying said control impulse to said second storage means to effect setting thereto to a binary state providing said plurality of control signals for application to said register means.

13. The combination defined in claim 11 further including a binary counter capable of stepping to a predetermined count, and means responsive to repeated setting of said first storage means for initiating operation of said counter to step to said predetermined count.

14. The combination defined in claim 13 further including alarm gate means responsive to said predetermined count of said binary counter in coincidence with application of said control impulse to said second storage means for producing an alarm signal.

15. The combination defined in claim 14 wherein said alarm gate means includes a first AND gate connected to the outputs of said binary counter for producing an actuating signal in response to an output from said counter representing said predetermined count and a second AND gate for producing said alarm signal upon coincident receipt of said actuating signal and the output from said second storage means representing a combination indicating a stuck relay condition.

16. The combination defined in claim 14 further including circuit means indicating the busy or free condition of said junctor means, and stuck relay means being operatively connected to said circuit means to indicate a busy condition of said junctor means.

References Cited

UNITED STATES PATENTS

| | | | |
|---|---|---|---|
| 3,385,932 | 5/1968 | Masure et al | 179—18 |
| 3,301,965 | 1/1967 | Germanton | 179—27.3 |
| 3,244,811 | 4/1966 | Vogel | 179—18.9 |
| 3,086,084 | 4/1963 | Brooks et al. | 179—18.7 |

KATHLEEN H. CLAFFY, Primary Examiner

T. W. BROWN, Assistant Examiner